United States Patent [19]
Tang

[11] Patent Number: 5,717,269
[45] Date of Patent: Feb. 10, 1998

[54] RELUCTANCE MACHINE WITH AUXILIARY FLUX PATH

[75] Inventor: Yifan Tang, St. Louis, Mo.

[73] Assignee: Emerson Electric Co., St. Louis, Mo.

[21] Appl. No.: 727,854

[22] Filed: Oct. 4, 1996

[51] Int. Cl.$^6$ .......................... H02K 17/00; H02K 17/12; H02K 1/14; H02K 1/10

[52] U.S. Cl. .......................... 310/168; 310/186

[58] Field of Search .................. 310/168, 166, 310/185, 186, 193, 254, 256

[56] References Cited

U.S. PATENT DOCUMENTS

| | | | |
|---|---|---|---|
| 4,348,605 | 9/1982 | Török | 310/168 |
| 5,331,245 | 7/1994 | Burgbacher et al. | 310/186 |
| 5,442,250 | 8/1995 | Stridsberg | 310/186 |

*Primary Examiner*—Clayton E. LaBalle
*Attorney, Agent, or Firm*—Arnold, White & Durkee

[57] ABSTRACT

An improved reluctance machine is provided wherein auxiliary flux paths are provided such that the leakage flux of the machine is directed through the auxiliary flux paths and not through the excited stator poles to reduce the impact of stator pole saturation on the machine's performance.

21 Claims, 15 Drawing Sheets

RELUCTANCE MACHINE WITH AUXILIARY FLUX PATH

FIELD OF THE INVENTION

This invention in general relates to reluctance machines and machine systems and, in particular, to switched reluctance machines and machine systems. Specifically, the invention relates to a novel switched reluctance motor design with an auxiliary flux path.

BACKGROUND OF THE INVENTION

Reluctance machines are well known in the art. In general, a reluctance machine is an electric machine in which torque is produced by the tendency of a movable part to move to a position where the inductance of an excited winding is maximized (i.e., the reluctance is minimized).

In one type of reluctance machine, the phase windings are energized at a controlled frequency. This type of reluctance machine is generally referred to as a synchronous reluctance machine. In another type of reluctance machine, circuitry is provided to determine the position of the machine's rotor, and the windings of a phase are energized as a function of rotor position. This type of reluctance machine is generally referred to as a switched reluctance machine. Although the description of the current invention is in the context of a switched reluctance machine, the present invention is applicable to all forms of reluctance machines, including synchronous and switched reluctance motors and to other machines that have phase winding arrangements similar to those of switched reluctance machines.

The general theory of design and operation of switched reluctance machines is well known and discussed, for example, in *The Characteristics, Design and Applications of Switched Reluctance Motors and Drives*, by Stephenson and Blake and presented at the PCIM '93 Conference and Exhibition at Nüremberg, Germany, Jun. 21–24, 1993.

Typical known reluctance machines include a stator, a rotor rotatably mounted with respect to the stator, where the stator defines a plurality of phase windings. In most known motors, each phase winding comprises a plurality of electrically conductive coils of wire (e.g., copper), and each coil of wire is wound about a different stator pole such that each coil of wire directly contacts and is wound directly about a single stator pole. FIG. 1 generally illustrates a conventional reluctance machine 10 having a rotor 12 defining four rotor poles and a stator 14 that defines six stator poles. For purposes of illustration, the stator poles are divided into three stator pole pairs 13A, 13B and 13C, with each pole pair comprising two opposing stator poles. Wound about the stator poles are three phase windings A, B and C where each phase winding comprises two coils and where the coils of phase winding A are placed directly around the poles of stator pole pair 13A, the coils of phase winding B are placed around the stator poles in group 13B and the coils of phase C are placed around the stator poles in group 13C.

When one of the phase windings A, B and C is energized by establishing electric current in the phase winding, the stator poles associated with that phase winding (e.g., stator pole group 13A for phase A) will be excited and become electromagnets. In machine 10, as in most all known conventional machines, each energizing coil is placed immediately adjacent to the sides of the stator pole the coil is intended to excite. For example, coil 16 is wound about, and intended to excite, stator pole 15. Thus, the two side turn portions 16a and 16b of coil 16 are positioned immediately adjacent the sides of stator coil 15. In a similar manner, each of the other coils of machine 10 is positioned immediately adjacent to the stator pole it is intended to excite.

While conventional machines, like machine 10, have relatively high torque densities with respect to other forms of electric machines, the full potential of such machines may not be fully realized. For example, in conventional machines, only one phase winding is energized at any given time. Thus, the entirety of the flux flow through the machine is steered through the stator poles that are excited by the energized phase winding.

FIG. 2 generally illustrates the flux pattern that will be established when the phase A winding of machine 10 is energized. As illustrated, at such a time the coils surrounding stator poles 15 and 17 are energized such that stator poles 15 and 17 are excited and the flux flow is "steered" through these excited poles.

As FIG. 2 illustrates, the main flow of flux through machine 10 as energized in FIG. 2 is from excited stator pole 17, across the air-gap, through the rotor 12, across the air-gap, through stator pole 15 and through the stator back-iron (or yoke) back to excited stator pole 17. This main flux flow is reflected by the flux path 20a and 20b. Because this main flux path crosses through the air-gap and passes through the rotor, it tends to produce torque and thus provides a path for the main torque-producing flux.

In addition to the main torque-producing flux, a certain amount of "leakage" flux is established in machine 10 that does not cross the air-gap to the rotor and that does not significantly contribute to torque production. This leakage flux tends to follow the flux paths 22a, 22b, 22c and 22d illustrated in FIG. 2. As reflected by flux paths 22a–22d, this leakage flux leaks across the sides of the excited stator poles, through the coils to the back-iron, and thus weakens the main torque-producing flux that would otherwise cross the air gap to the rotor.

From an analysis of FIG. 2, it may be noted that when only one phase winding is energized, only the excited stator poles are used for torque production. The unexcited stator poles adjacent the excited pole, e.g., poles 18a and 18b, are not used in torque production and are magnetically and electrically idle. Accordingly, in conventional machines like machine 10 of FIG. 2, at each instant of operation, there is a large amount of active material (e.g., stator iron) that is not fully utilized for torque production.

In addition to failing to take full advantage of all of the active stator material, conventional machines, like machine 10, are limited with respect to the peak flux-linkage of the energized machine and, thus, the peak torque output of the machine. In particular, in machine 10, essentially all of the flux flow established when a phase is energized (i.e., the main torque producing flux and the leakage flux) passes through the excited stator pole. Because of the limitations from which reluctance machines are constructed, however, the maximum practical flux flow through the excited stator pole is not infinite but is limited to some peak "saturation" value especially as poles of the rotor move into alignment with poles of the stator. Thus, once the flux flow through the stator pole reaches the saturation value, additional increases in the current in the energizing coil will not appreciably increase the flux flowing through the energized pole. This "saturation bottleneck" essentially limits the peak flux-linkage of the energized coil to correspond to the saturation flux of the excited stator pole. Moreover, the saturation bottleneck also limits the magnitude of the main torque producing flux to the saturation flux of the stator pole minus the leakage flux.

The saturation bottleneck associated with conventional reluctance machines may be further understood by reference to FIG. 3 which generally illustrates an equivalent magnetic circuit for machine 10 of FIG. 2. In general FIG. 3 illustrates a magnetic core 30 (corresponding to the stator core 12) having projecting pole portions 31a and 31b (corresponding, respectively, to poles 15 and 17 of machine 10). A paramagnetic element 32 (corresponding to the rotor) is positioned within the air gap defined by the magnetic core 30. Energizing coils 34a and 34b are wound about poles 31a and 31b, respectively. The other stator poles are represented by poles 33a, 33b, 33c and 33d.

When the energizing coils 34a and 34b are energized, a flux pattern will be established such that the flux flows through the energized coil 34a and through the pole portion 31a. The flux flowing through the pole portion 31a divides into a main flux path 35 which flows through element 32 and leakage flux paths 36a and 36b. Notably, because the sum of the main flux and the leakage flux is limited to the saturation flux of pole portion 31a, the maximum flux-linkage of coil 34a is limited to that associated with the saturation flux of pole 31a. Moreover, the maximum flux through the element 32 is limited to the saturation flux of pole 31a a minus the leakage flux. As illustrated in the figure, the flux paths established when coil 34b is energized correspond to those for coil 34a. Specifically, when coil 34b is energized a main flux path 35 and leakage flux paths 36c and 36d are established.

The constraints on peak flux-linkage and peak main flux in conventional reluctance machines tend to limit the peak torque densities and power densities such machines may exhibit.

In addition to limiting the peak flux-linkage and peak torque output, the stator pole saturation "bottleneck" also tends to limit the maximum efficiency of conventional reluctance machines. As those of ordinary skill in the art will appreciate, as a reluctance machine is operating, there is a continual flow of energy between the drive used to energize the machine and the machine. In general, each time a phase winding is energized, power flows from the drive to the machine to: (i) set up the flux pattern, and (ii) create positive output torque. Each time a phase winding is deenergized a portion of the energy initially provided to the machine to set up the flux pattern is returned to the drive. The less energy that is required to set up a flux pattern of a given strength, the higher the efficiency of the machine.

The amount of energy required to set up a flux pattern at a given strength in a reluctance machine depends in an inverse fashion, in large part, on the ratio of peak magnitude of the flux within the machine to the magnitude of the excitation current. As explained above, the peak magnitude of the flux in conventional reluctance machines is limited by the saturation magnitude of the stator poles. Thus, even though the main back-iron of the machine may be capable of handling a peak flux greater than the stator pole saturation flux, the limits of the machine inhibit such a situation. Accordingly, the saturation bottleneck tends to limit the maximum efficiency of conventional reluctance machines.

It is an object of the present invention to provide an improved reluctance machine that provides an auxiliary flux path such that all of the flux of the machine does not pass through the excited stator poles and the impact of the stator pole bottleneck is minimized. It is a further object of the present invention to overcome the described and other limiting characteristics of conventional reluctance machines and provide an improved reluctance machine that utilizes more of the active stator material than is utilized by conventional machines, that minimizes the impact of pole saturation on maximum torque production, and that minimizes torque degrading flux leakage. Other objects and features of the present invention will be apparent to those skilled in the art having the benefit of this disclosure.

SUMMARY OF THE INVENTION

The present invention relates to an improved reluctance machine having an auxiliary flux path.

In accordance with one embodiment of the present invention a stator for a reluctance machine is provided where the stator defines at least a first stator pole and the stator includes a coil of electrically conductive material positioned generally about the first pole, such that, when the stator is excited by establishing electric current in the coil, a main flux path is established through the first stator pole and an auxiliary flux path is established that does not pass through the first stator pole.

In accordance with a different aspect of the present invention a reluctance machine is provided that includes a stator defining a plurality of stator poles, a rotor adapted to rotate relative to the stator, and a plurality of phase windings positioned within the stator, wherein at least one phase winding includes a plurality of coils, wherein each coil is generally wound about at least one stator pole so as to excite the one stator pole when the coil is energized, and wherein application of electric current to the at least one phase winding establishes main flux paths through the excited stator poles and auxiliary flux paths through non-excited stator poles.

In accordance with yet another aspect of the present invention a stator for a reluctance machine is provided that includes stator core that defines a plurality of stator poles including a first stator pole and a second stator pole adjacent to the first stator pole, the first and second stator poles defining a first inter-polar gap there between; and a first phase winding comprising a coil, the coil defining a first side turn portion, wherein the coil generally encircles the first stator pole and wherein the first side turn portion is positioned within the first inter-polar gap such that the first side turn position is physically closer to the second stator pole than to the first stator pole.

A still further embodiment of the present invention is directed to a stator for a reluctance machine that includes a stator core defining a plurality of stator poles; and at least one phase winding, the at least one phase winding comprising a plurality of coils wherein each coil generally encircles one stator pole; wherein each coil defines two side turn portions and wherein the coils are positioned within the stator such that each side turn portions of a given coil is physically closer to a stator pole that is not encircled by the coil than to the stator pole encircled by the coil.

Aspects of the present invention are also directed to a reluctance machine including: stator defining a plurality of stator poles; at least one phase winding wound about the stator poles, the at least one phase winding defining at least one coil generally encircling at least one stator pole, wherein the coil is positioned about the at least one stator pole such that the magnetic flux passing through the at least one coil when the coil is energized is equal to the sum of: (i) flux passing through the at least one stator pole and (ii) the flux passing through an auxiliary flux path that does not include the at least one stator pole.

Other aspects and advantages of the present invention will become apparent upon reading the following detailed description and upon reference to the drawings.

DETAILED DESCRIPTION OF THE INVENTION

Figure 4:
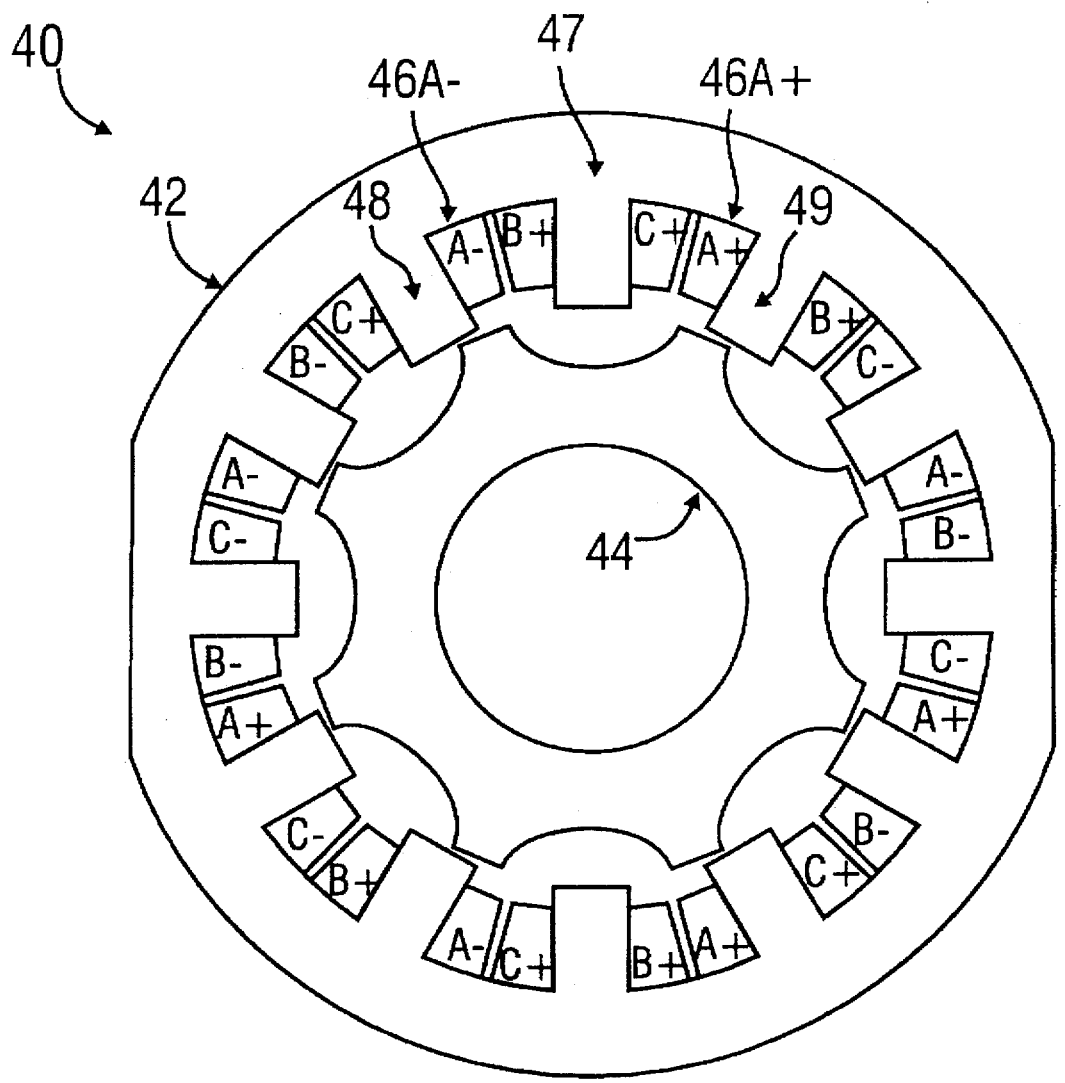
FIG. 4 generally illustrates an exemplary reluctance machine 40 in accordance with the present invention.

Turning to the drawings and, in particular, to FIG. 4, a cross-section of an improved reluctance machine 40 in accordance with the present invention is illustrated. In general, the machine 40 comprises a number of laminations of para-magnetic material (e.g., iron or steel) where each of the laminations takes the general form of the illustrated stator cross-section 42 reflected in FIG. 4. In general, the stator cross-section 42 defines twelve inwardly extending stator poles. The stator laminations may be constructed according to known manufacturing practices and the stator of machine 40 may be constructed using known techniques.

The twelve inwardly projecting stator poles of machine 40 define a central bore within which is positioned a rotor 44 that is mounted on bearings (not illustrated) and is free to rotate. In the exemplary embodiment of FIG. 4, the rotor 44 defines eight rotor poles. The rotor 44 may be of conventional construction. Those of ordinary skill in the art will appreciate that the three-phase, twelve-stator pole, eight-rotor pole machine of FIG. 4 is provided for purposes of illustrating the present invention, and that the present invention is applicable to machines having differing numbers of rotor poles, stator poles or phase windings.

Positioned within the stator 42 are three phase windings A, B and C. In the embodiment of FIG. 4, each of the phase windings A, B and C comprises four coils of conductive material (e.g., copper wire) and the four coils of the phase winding may be electrically connected in series or parallel to form a single phase winding. The placement of the coils forming the phase windings A, B and C of machine 40 is different from that found in conventional reluctance machines. In particular, the coils comprising the phase windings in machine 40 are not placed adjacent to the stator poles which they energize but are, instead, "interleaved" such that each phase coil is separated from the stator pole it surrounds by the side turns of another phase coil. This is reflected generally in FIG. 4 by the coil notations which illustrate the side turn portions of the coils of the phase windings A, B and C.

In FIG. 4, the + and − notations associated with the coil side turn designations indicates whether positive electric current flows into the page (for a− designation) or out of the phase (for a + designation). Thus, the coil designated 46 in FIG. 4 is one of the coils in phase winding A and has side turn portions 46A− and 46A+. As reflected in FIG. 4, the coil 46 encircles and excites stator pole 47. The side turn portions of the coil 46, however, are not positioned adjacent to the sides of stator pole 47 but are, instead, positioned at a location some distance from stator pole 47. In the exemplary embodiment of the FIG. 4, the side turn portions of coil 46 are positioned adjacent to the stator poles 48 and 49, which are themselves adjacent to stator pole 47. Moreover, in the embodiment of FIG. 4, the side turn portions of coil 46 are separated from stator pole 47 by side turn portions which form other phase windings such that a side turn portion from a phase B coil separates side turn portion 46A− from stator pole 47, and a side turn portion from a phase C coil separates side turn portion 46A+ from stator pole 47. As reflected in FIG. 4, the remaining coils form phase A and the coils for phases B and C are wound in a fashion similar to coil 46.

The "interleaved" nature of the coils of machine 40 provides an auxiliary flux path through which the leakage flux may flow. The provision of this auxiliary flux path tends to mitigate the stator pole saturation bottleneck and flux leakage problems associated with conventional machines and provides a reluctance machine having a higher torque output (and thus, higher torque and power densities) than that available from conventional machines.

Figure 5:
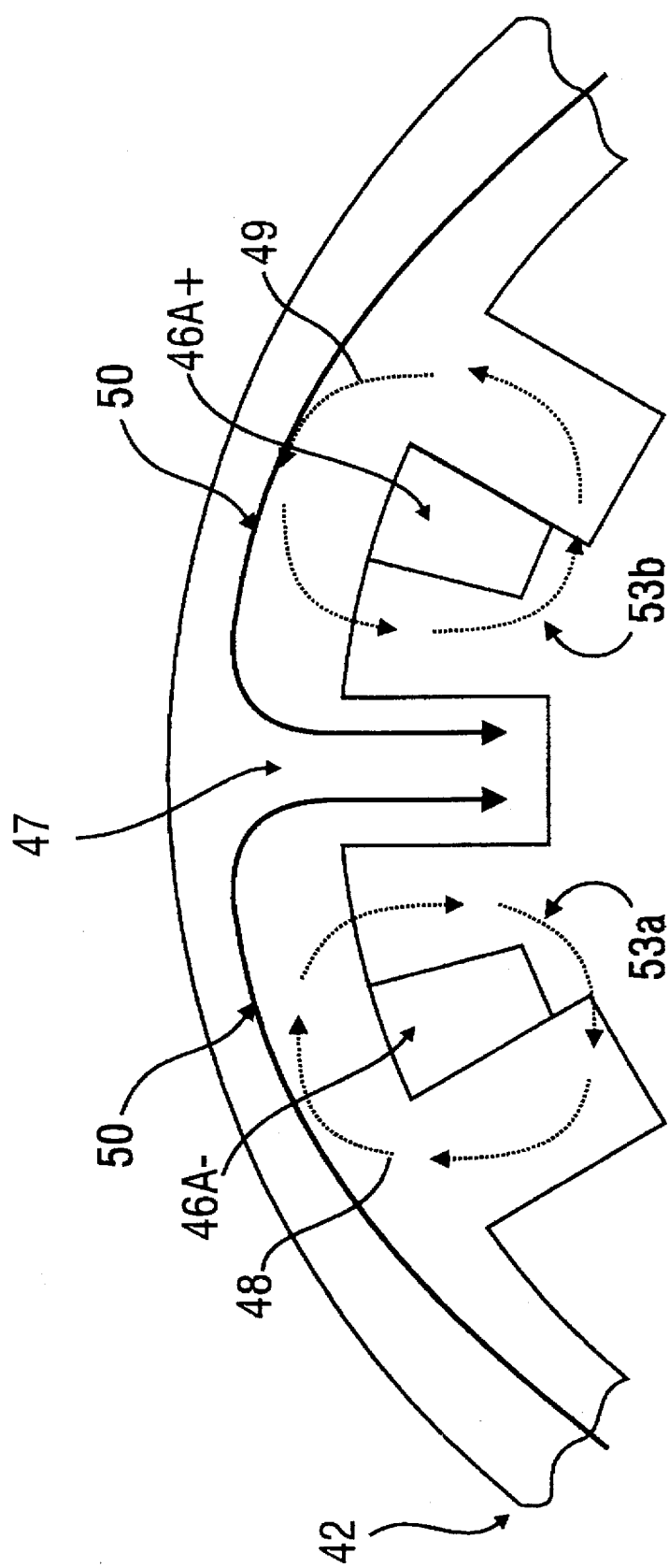
FIG. 5 generally illustrates the flux pattern associated with one of the starter poles of machine 40 when the coil that excites that pole is energized.

FIG. 5 generally illustrates the manner in which the winding scheme of machine 40 provides for increased machine performance. Specifically, FIG. 5 illustrates the flux pattern associated with one of the stator poles of machine 40 when the coil that excites that pole is energized.

Referring to FIG. 5, one of the stator poles 47 of machine 40 is illustrated as is the coil 46 surrounding the coil including coil side turn portions 46A+ and 46A−. For clarity, the coil side turn portions that would be positioned between coil side turn portions 46A+ and 46A− and the sides of pole 47 are not illustrated. As illustrated in FIG. 5, when coil 46 is energized, a main flux path 50 is established through which flux will flow through the stator pole 47, across the air-gap and through the rotor. Two auxiliary flux paths 53a and 53b are also established when phase winding 46 is energized. These auxiliary flux paths provide a flux path for the leakage flux associated with the energization of coil 46.

As reflected in FIG. 5, virtually all of the flux flowing through the stator pole crosses the air-gap and contributes to the development of positive torque. Unlike in conventional machines where the leakage flux passes through at a least a portion of the excited stator pole, the leakage flux in the machine of FIG. 5 does not pass through the excited stator pole but instead passes through auxiliary flux paths passing through at least a portion of the two "idle" poles 48 and 49 adjacent excited stator pole 47, since flux seeks the path of minimum reluctance and iron has a lower reluctance than air.

The steering of the leakage flux through the auxiliary flux paths 53a and 53b allows the machine of the present invention to have a higher torque density than conventional reluctance machines. In particular, as discussed above, because of the nature of conventional machines and the stator pole saturation "bottleneck," the maximum torque producing flux in a conventional machine is limited to the saturation flux of the excited stator pole minus the leakage flux. Because there is virtually no leakage flux flowing through the energized stator pole in the exemplary machine of FIG. 5 due to the positioning of the coils in the machine of the present invention which discourages such flow, virtually all of the flux flowing through the energized stator pole is torque-producing flux. As such, the peak magnitude of the torque-producing flux is approximately equal to the saturation flux of the excited stator pole. Because the leakage flux is not flowing through the excited stator pole, the peak torque-producing flux in the machine of FIG. 5 is not constrained by the leakage flux.

In addition to providing increased torque output, the novel winding scheme exemplified by FIGS. 4 and 5 provides a machine with higher flux-linkages than previously available in conventional reluctance machines.

As those of ordinary skill in the art will appreciate, the flux-linkage a reluctance machine is proportional coil in a reluctance machine is proportional to the magnitude of the flux passing through the excited phase winding. As discussed above, for a given phase energization current, the peak fluxlinkage of a conventional reluctance machine is limited by the peak saturation flux of the excited stator pole. In the exemplary machine of FIG. 4 and 5, both the flux through the stator pole and the leakage flux pass through the excited phase winding. As such, the total magnitude of the flux flowing through the excited winding in the exemplary machine of the present invention is equal to the sum of the flux flowing through the stator pole (which may be as high as the saturation flux of the stator pole) plus the leakage flux flowing through auxiliary flux paths 53a and 53b. Thus, the magnitude of the flux passing through the energized coil 52 in the machine of the present invention is not limited to the saturation flux of the excited stator pole and can be greater than the saturation flux of the stator pole. As such the peak flux-linkage, and thus the torque density and power density, of the exemplary machine of the present invention can be greater than was possible with conventional reluctance machines. Moreover, because the peak flux in the back-iron of the machine of the present invention can be greater than that in conventional machines, the amount of energy stored in the reluctance machine is increased, thus, providing for more efficient machine operation.

The magnitude of the increase in flux-linkage of the exemplary machine of the present invention over that available from conventional designs becomes more significant as: (i) the rotor moves closer to the aligned position, and (ii) the phase energization current is increasing (i.e., the saturation characteristics of the excited stator pole become limiting). Moreover, the increase in flux-linkages associated with the exemplary machine of the present invention is more significant at and near aligned rotor positions than at unaligned rotor positions. Because of this variation in the flux-linkage with rotor position and the increased flux linkage associated with the aligned position, the Lmax/Lmin ratio (and thus the dL/dt factor) of the exemplary machine of the present invention increases. This increase results in a corresponding increase in torque output.

Figure 6:
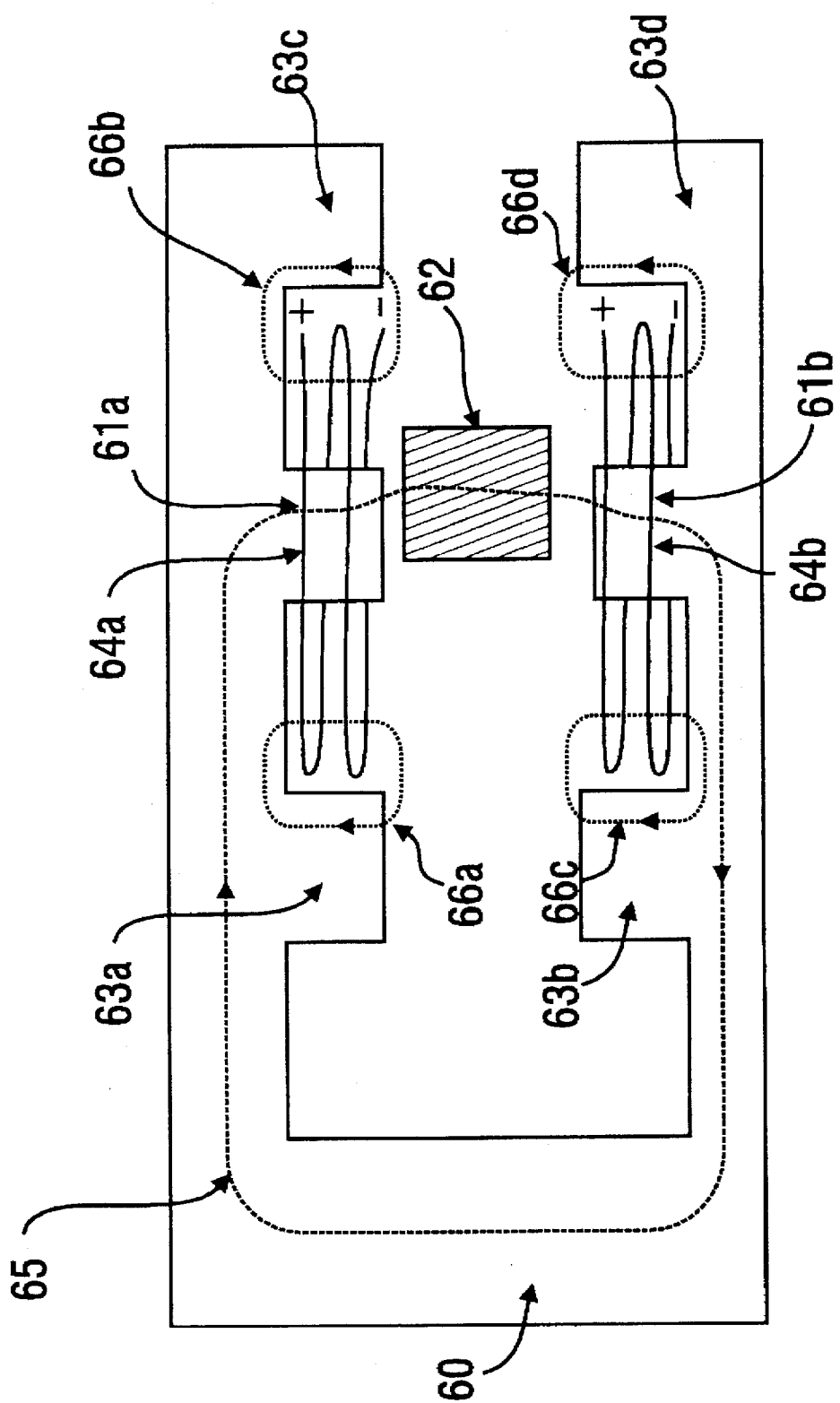
FIG. 6 provides an equivalent magnetic circuit for the machine of FIGS. 4 and 5.

The benefits of the winding scheme of the present invention and the auxiliary flux paths provided thereby are further illustrated by the equivalent circuit of FIG. 6. Referring to FIG. 6 a para-magnetic core 60 is provided. Wound about the projecting poles 61a and 61b are energizing coils 64a and 64b. The magnetic core defines a first main flux path 65 passing through poles 61a and 61b and a para-magnetic member 62. This portion of the circuit is equivalent to the stator, the phase winding, the excited stator poles and the rotor of the exemplary machine of the present invention.

Figure 1:
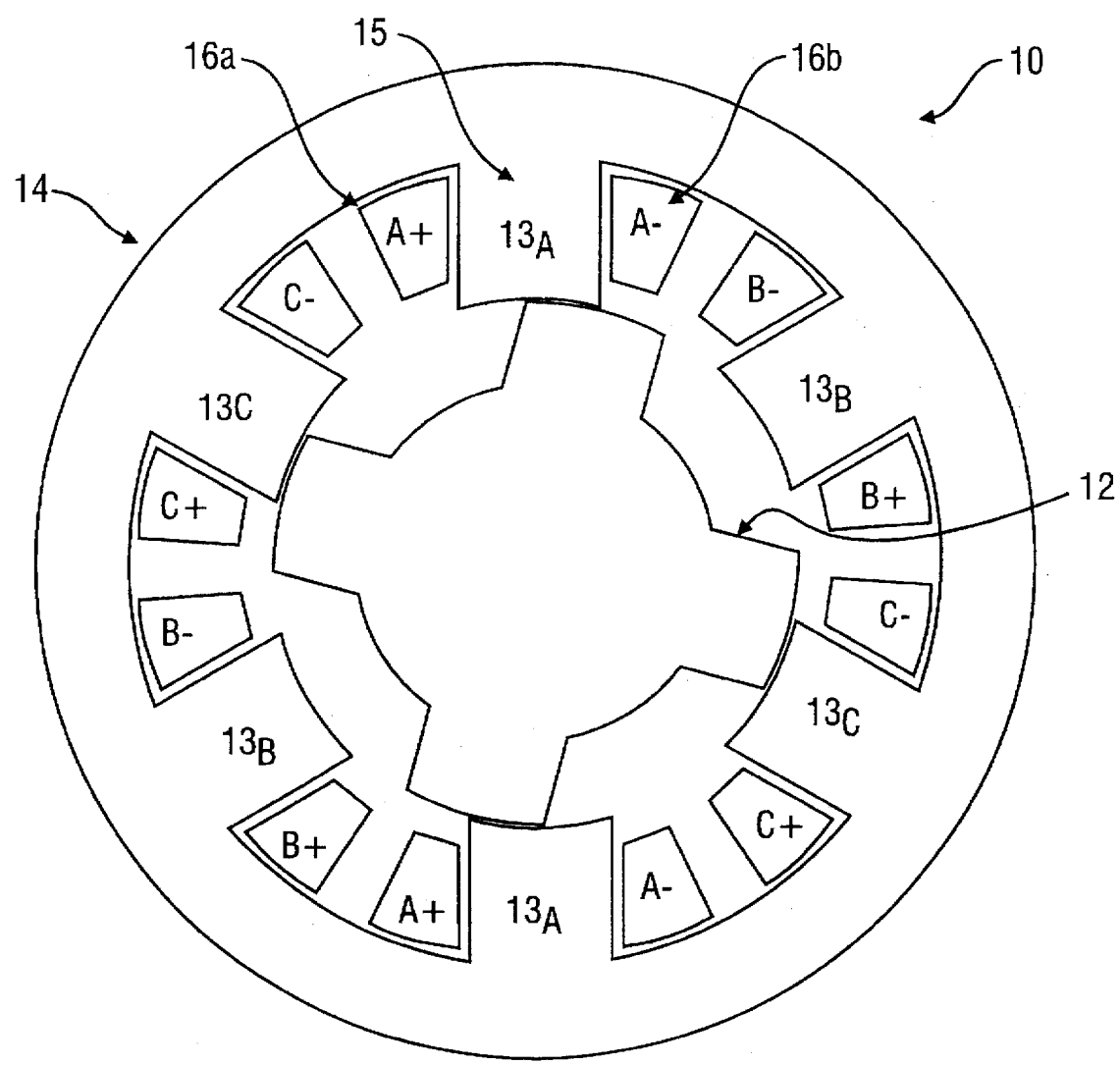
FIG. 1 generally illustrates a conventional reluctance machine 10.
Figure 2:
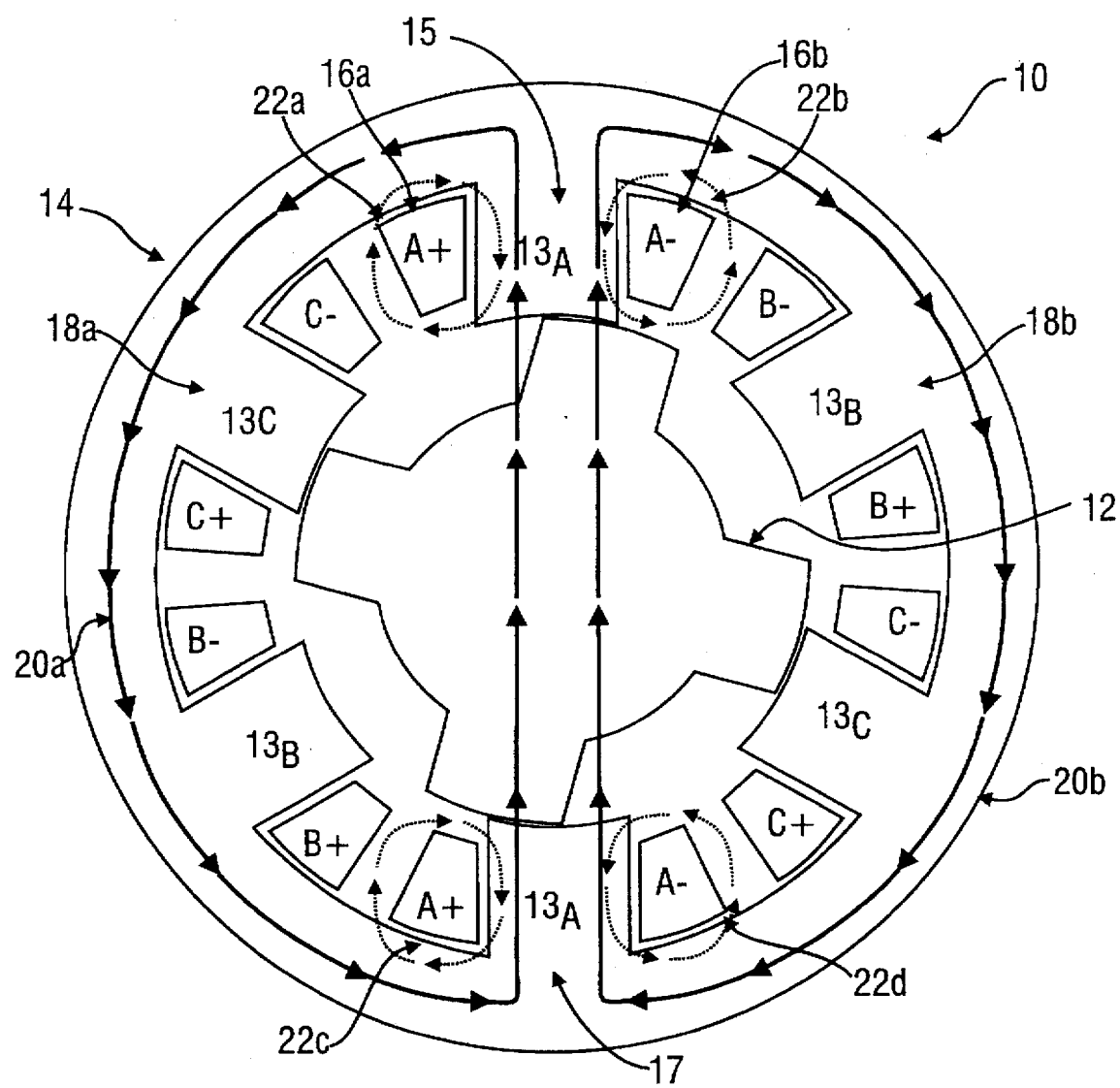
FIG. 2 generally illustrates the flux pattern established when a phase winding of machine 10 is energized.
Figure 3:
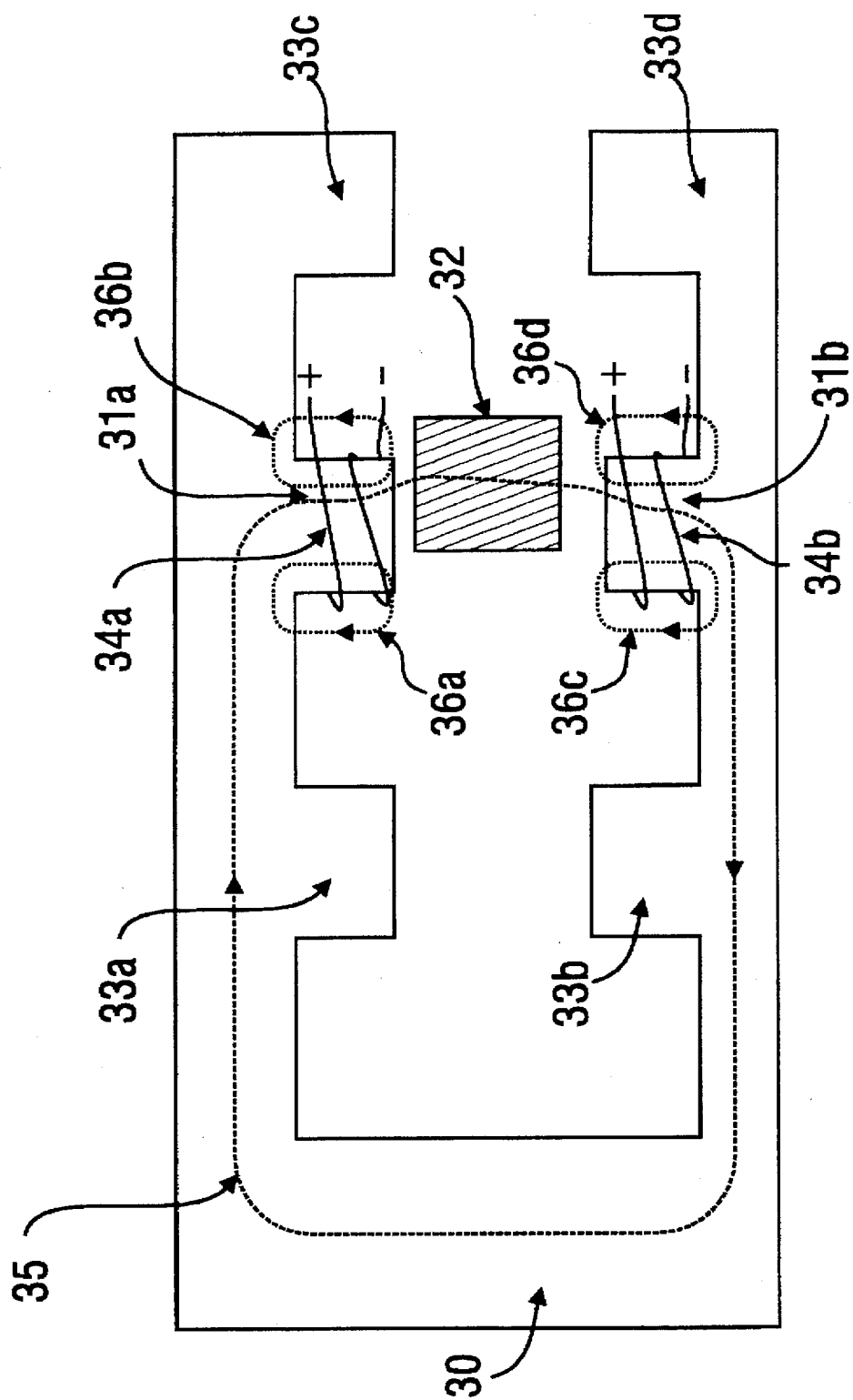
FIG. 3 provides an equivalent magnetic circuit for the magnetic pattern established when the machine 10 is energized as reflected in FIG. 2.

Also provided is an auxiliary flux path 66 which provides a path for leakage flux that does not pass through the excited pole portion. Thus, the winding 64 may be excited with current to the point where the flux flowing through the projecting-pole portion 61 is saturated. At this point, the flux-linkage of winding 64 will be proportional to the flux passing through the pole portion plus the leakage flux passing through the auxiliary flux path. Comparing the equivalent circuit of FIG. 6 (corresponding to an exemplary machine of the present invention) with that of FIG. 3 (corresponding to conventional reluctance machines), it may be noted that the peak flux-linkage available from the exemplary machine of the present invention is greater than that available from conventional machines. Moreover, with the parallel utilization of the projecting poles 63a through 63d, corresponding to the stator poles in the machine of the present invention, reluctance to the flux pattern has decreased.

In the exemplary embodiment of the present invention illustrated in FIGS. 4 and 5, the inter-polar gap between adjacent stator poles is filled only by the side turn portions of the coils of the phase windings. Alternate embodiments of the present invention are envisioned in which inter-polar projections are provided to enhance the auxiliary flux paths established by the winding scheme of the present invention and to provide increased machine performance. This alternate embodiment of the present invention is reflected in FIGS. 7A and FIGS. 7B.

Figure 7A:
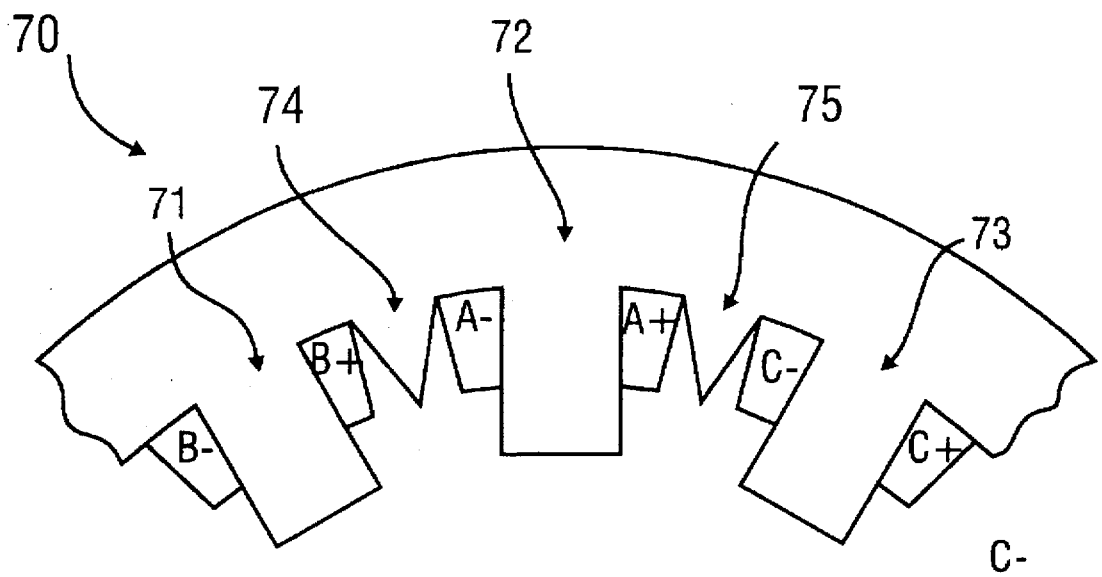
FIG. 7A illustrates a conventional reluctance machine having inter-pole projections.

FIG. 7A illustrates a conventional reluctance machine 70 having stator poles 71, 72 and 73 and inter-polar projections 74 and 75. Wound directly around each of the stator poles 71, 72 and 73 is a phase energization coil. In the machine 70, each energization coil is wound directly around the stator poles that it is intended to excite. Thus, the phase winding coil for phase B is wound directly around stator pole 71, the phase winding for phase A is wound directly about stator pole 72 and the phase winding for phase C is wound directly about stator pole 73. There is no "inter-leaving" of the phase energization coils. In this conventional machine, the purpose of the inter-polar projections is to aid in dissipating heat from the phase windings. The inter-polar projections (referred to as "heat spikes") do not positively participate in torque production or in flux-linkage creation and, in fact, encourage leakage flux and may tend to reduce torque output.

Figure 7B:
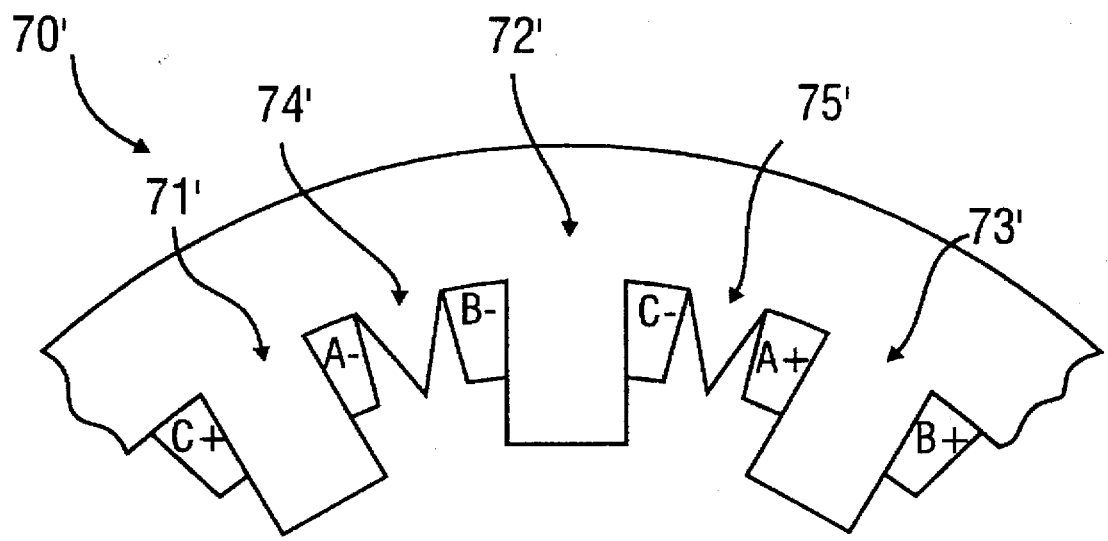
FIG. 7B illustrates an exemplary reluctance machine according to certain aspects of the present invention including inter-pole projections.

FIG. 7B illustrates an exemplary machine in accordance with certain aspects of the present invention in which inter-polar projections are provided between the stator poles. The construction of the stator core 70' of the machine of FIG. 7B is similar to that of stator 70 of FIG. 7A in that stator poles 71', 72' and 73' are provided as are inter-pole projections 74' and 75'. The coils comprising the phase windings in the machine of FIG. 7B, however, are placed within the stator in a manner different from that of the conventional machine of FIG. 7A. In particular, in the novel machine of FIG. 7B, each coil surrounds both: (i) the stator pole it is intended to excite, and (ii) the inter-pole projections adjacent to the stator pole it is intended to excite. Thus, the coil for phase winding A is wound about inter pole projections 74' and 75' such that it encircles both the inter-pole projections 74', 75' and the stator pole 72'. In a manner similar to that described above in connection with FIGS. 4 and 5, the novel winding scheme of the exemplary embodiment of FIG. 7b provides alternate flux paths which increase the machine performance in the manner described above.

Figure 8:
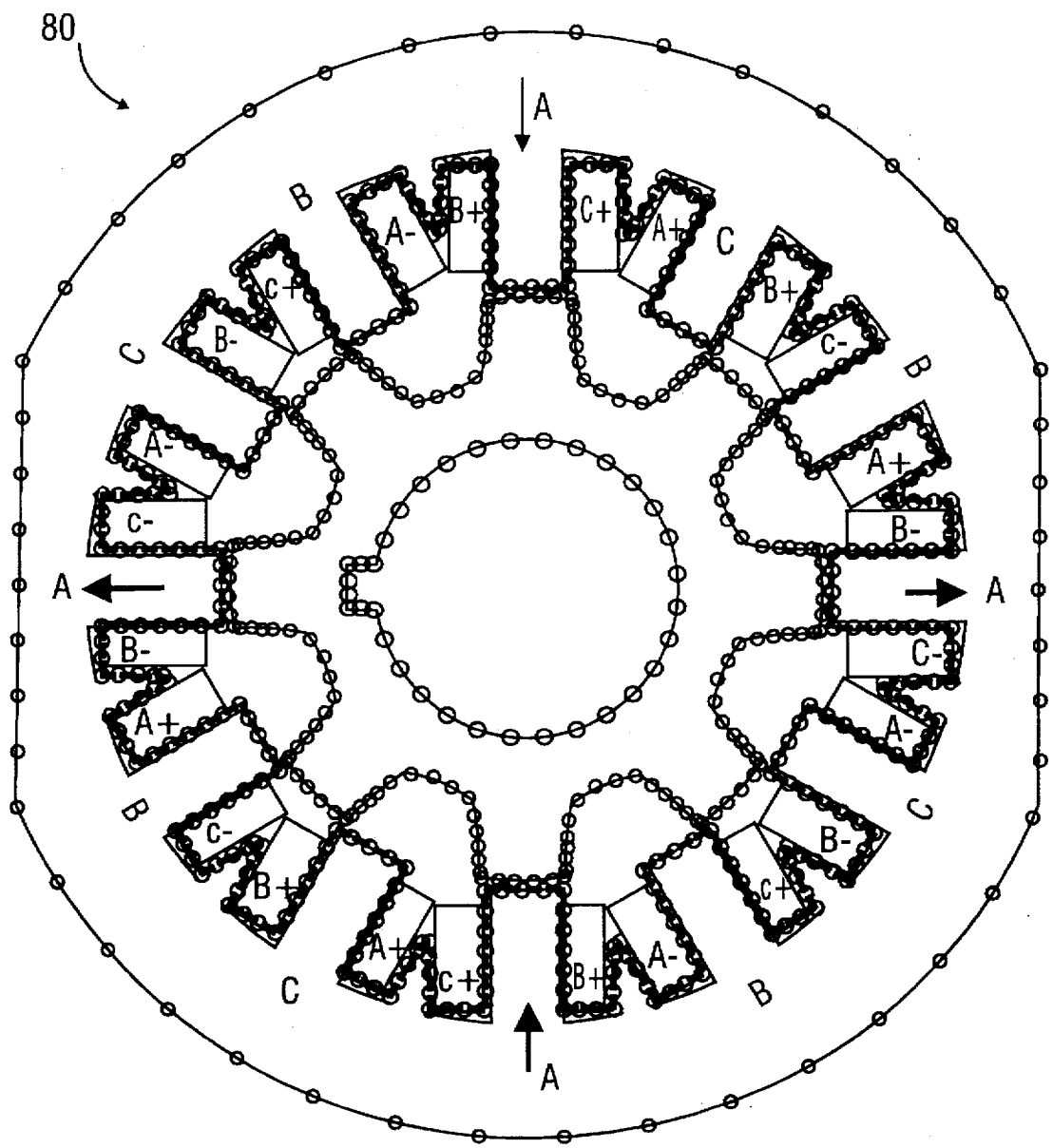
FIG. 8 illustrates an exemplary three phase, twelve stator pole, eight rotor pole reluctance machine according to certain aspects of the present invention.

FIG. 8 illustrates an exemplary complete winding scheme in accordance with the present invention for twelve stator pole/eight rotor pole machine 80 having inter-pole projections. The same notation scheme used for FIG. 4 is used to identify the windings of machine 80. Those of ordinary skill in the art will appreciate that the construction of the inter-polar projections reflected in FIG. 8 is exemplary and that alternate designs may be used to take full advantage of the teachings of the present invention and the geometries that may be found in particular reluctance machines.

Figure 9A:
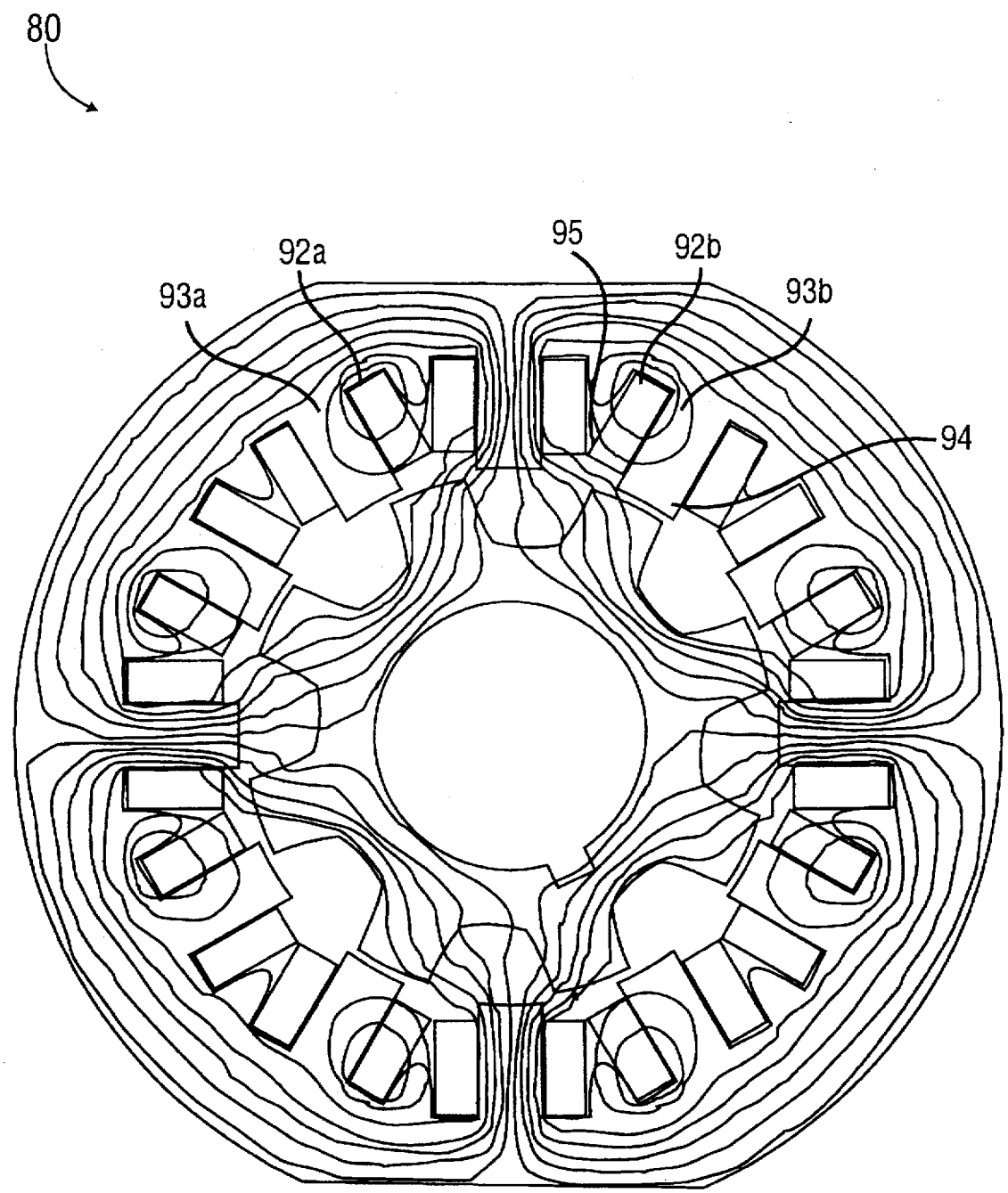
FIGS. 9A and 9B compare the flux pattern of the machine of FIG. 8 with that of a conventional reluctance machine at an unaligned rotor position.

FIG. 9A illustrates the flux pattern established in the reluctance machine 80 of FIG. 8 when the phase A winding including coils having side turn portions 92a and 92b, and other coils, is energized. As illustrated in the figure, when these coils are energized, auxiliary flux paths 93a and 93b are established adjacent each excited stator pole. Moreover, each of these auxiliary flux paths includes an "idle" stator pole and an inter-pole projection. One such auxiliary flux path including stator pole 94 and inter-pole projection 95 is labeled in FIG. 9A.

Figure 9B:
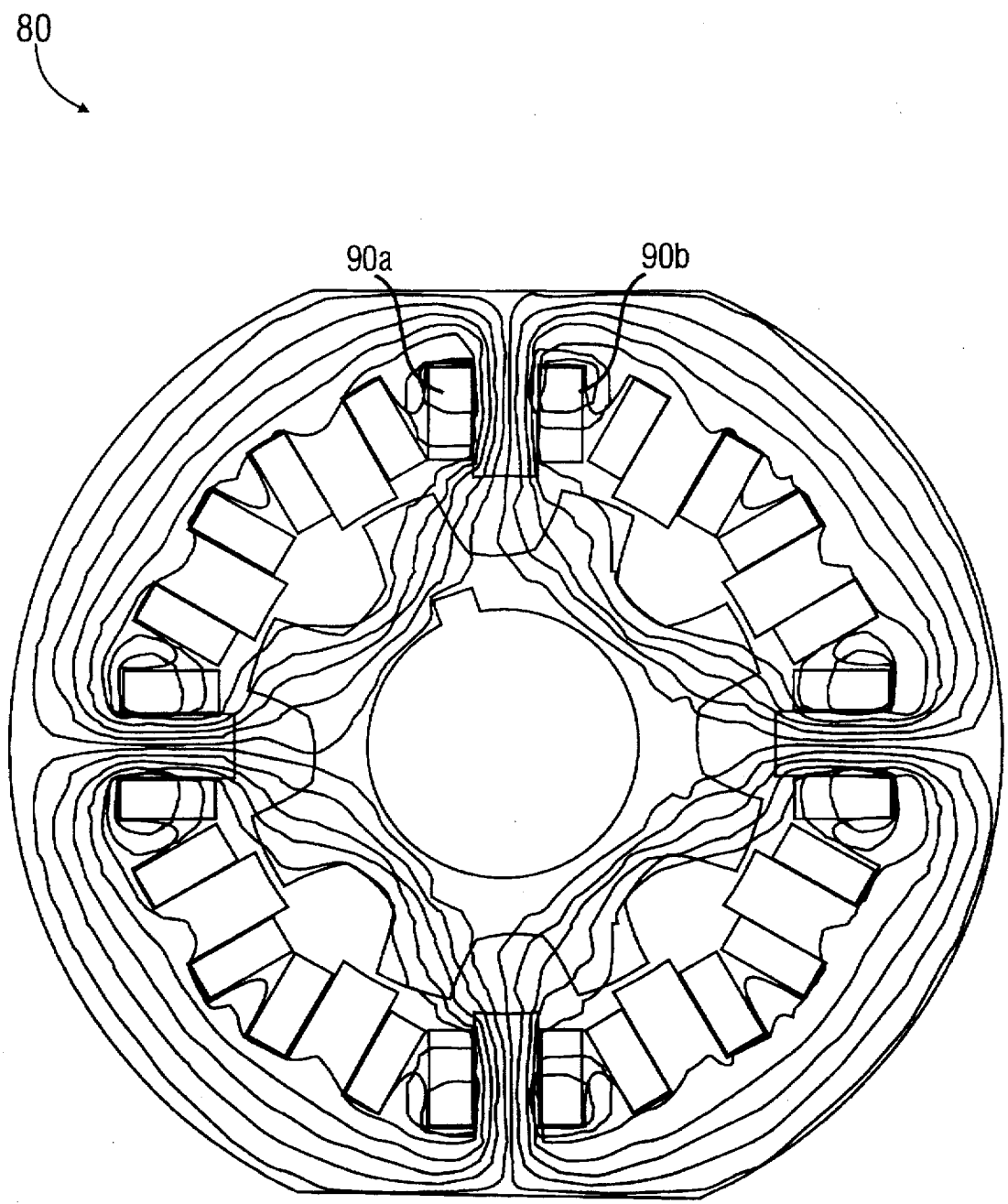

For comparison purposes, FIG. 9B illustrates the flux pattern established in a conventional reluctance machine wound like that of FIG. 7A when the same phase A winding including the coils having side turn portions 90a and 90b and other coils is energized. As reflected in the figure, in such conventional machines, there are no auxiliary flux paths and the leakage flux flows through the excited stator poles.

Figure 10A:
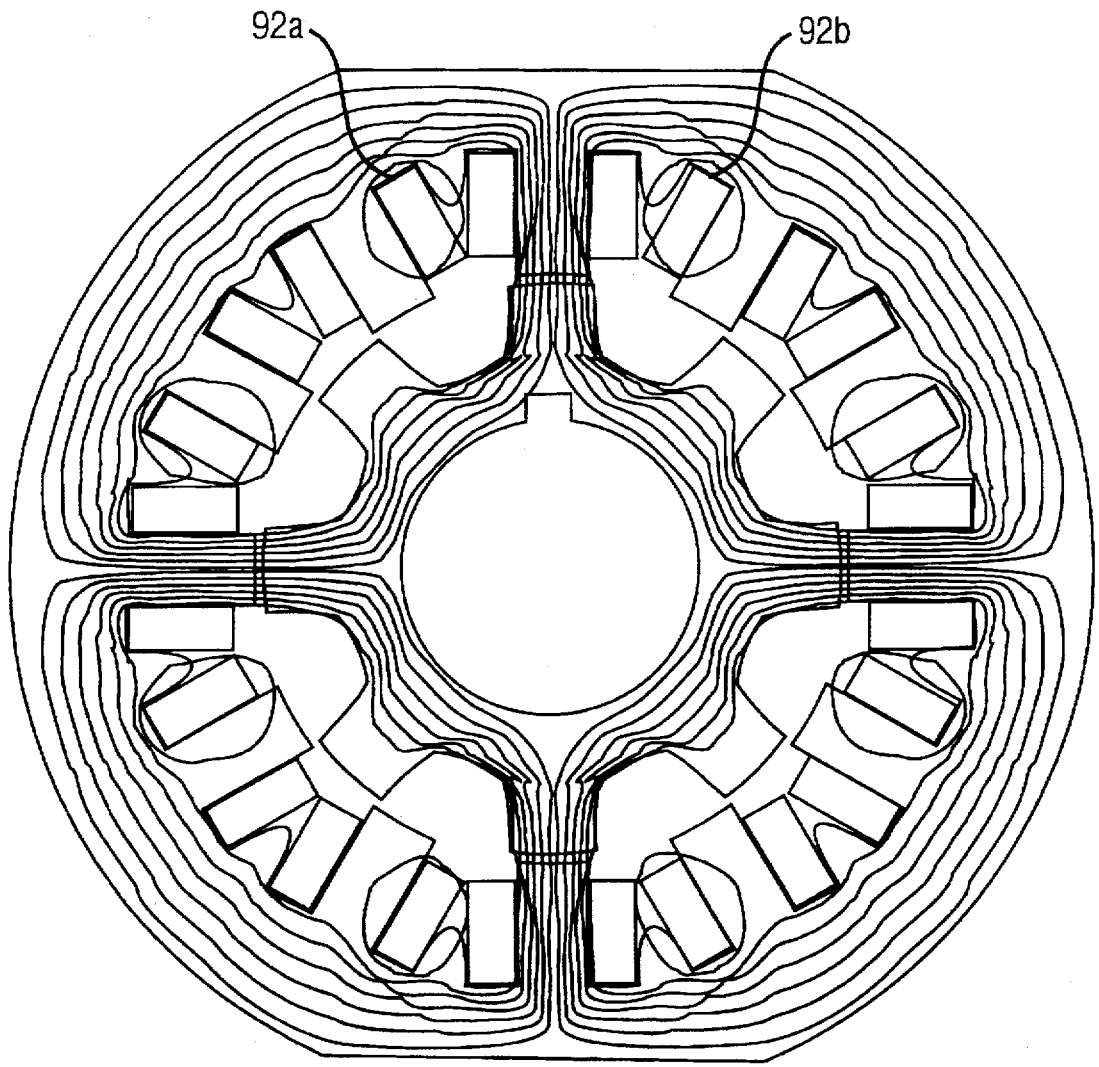
FIGS. 10A and 10B compare the flux pattern of the machine of FIG. 8 with that of a conventional reluctance machine oat an aligned rotor position.
Figure 10B:
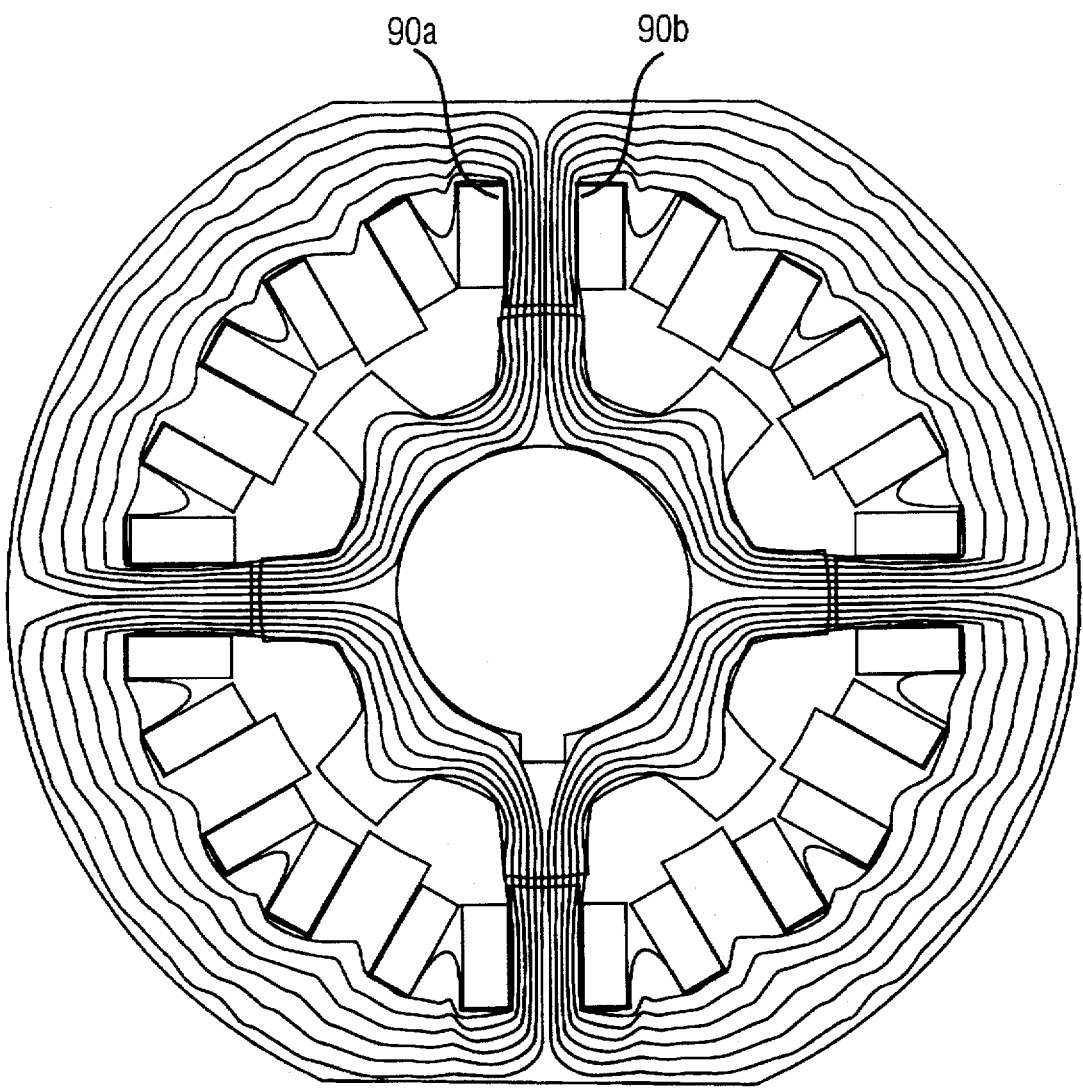

FIG. 10A illustrates the flux pattern established in the machine 80 when the phase A winding A including the coils having side turn portions 92a and 92b and other coils is energized and the rotor is at an aligned position with respect to the excited stator poles. As reflected in the figure, even at this aligned position, auxiliary flux paths exist. Again, for purposes of comparison, FIG. 10B illustrates the flux pattern of a conventional machine when the phase A winding including the coils having coil side turn portions 90a and 90b and other coils is energized. As reflected in this figure, in the aligned position there is essentially no leakage flux flow and virtually all of the flux passes through the excited stator poles.

As discussed above, the use of the novel winding scheme of the present invention tends to result in a relatively high Lmax/Lmin ratio. This is reflected in FIG. 11 which generally plots and compose flux-linkage vs. phase energization currents for a machine with inter-polar projections wound according to certain aspects of the present invention (e.g., a machine like that illustrated in FIG. 8) and a conventionally wound machine with inter-polar projections utilizing the same basic stator laminations as the machine of FIG. 8. As reflected in FIG. 11, at both the aligned and unaligned rotor positions, the flux-linkages of the machine of the present invention is greater than that of a conventionally wound machine for a given phase energization current. Moreover, the differential between the flux-linkages of the machine of the present invention and conventional machines is greater at the aligned position than at the unaligned position for any given phase energization current. For example, at a phase current of 60 amps, the differential between the flux-linkages of the machine constructed according to aspects of the present invention and a conventional machine at the unaligned position is reflected by the distance 110. The corresponding differential at the aligned position is represented by the distance 112. As may be observed, the distance 112 is greater than the distance 110. Moreover, it may be observed that the differential between the increased flux-linkages of the present invention and that of conventional machines increases with increasing phase current. This is believed to occur because, in conventional machines, the stator pole saturation bottleneck begins to limit the peak flux-linkages of the machine long before stator pole saturation begins to significantly limit flux-linkages in machines constructed according to the present invention. In summary, FIG. 11 reflects the fact that the novel winding scheme disclosed herein provides significant advantages in terms of providing a relatively high Lmax/Lmin ratio.

Figure 11:
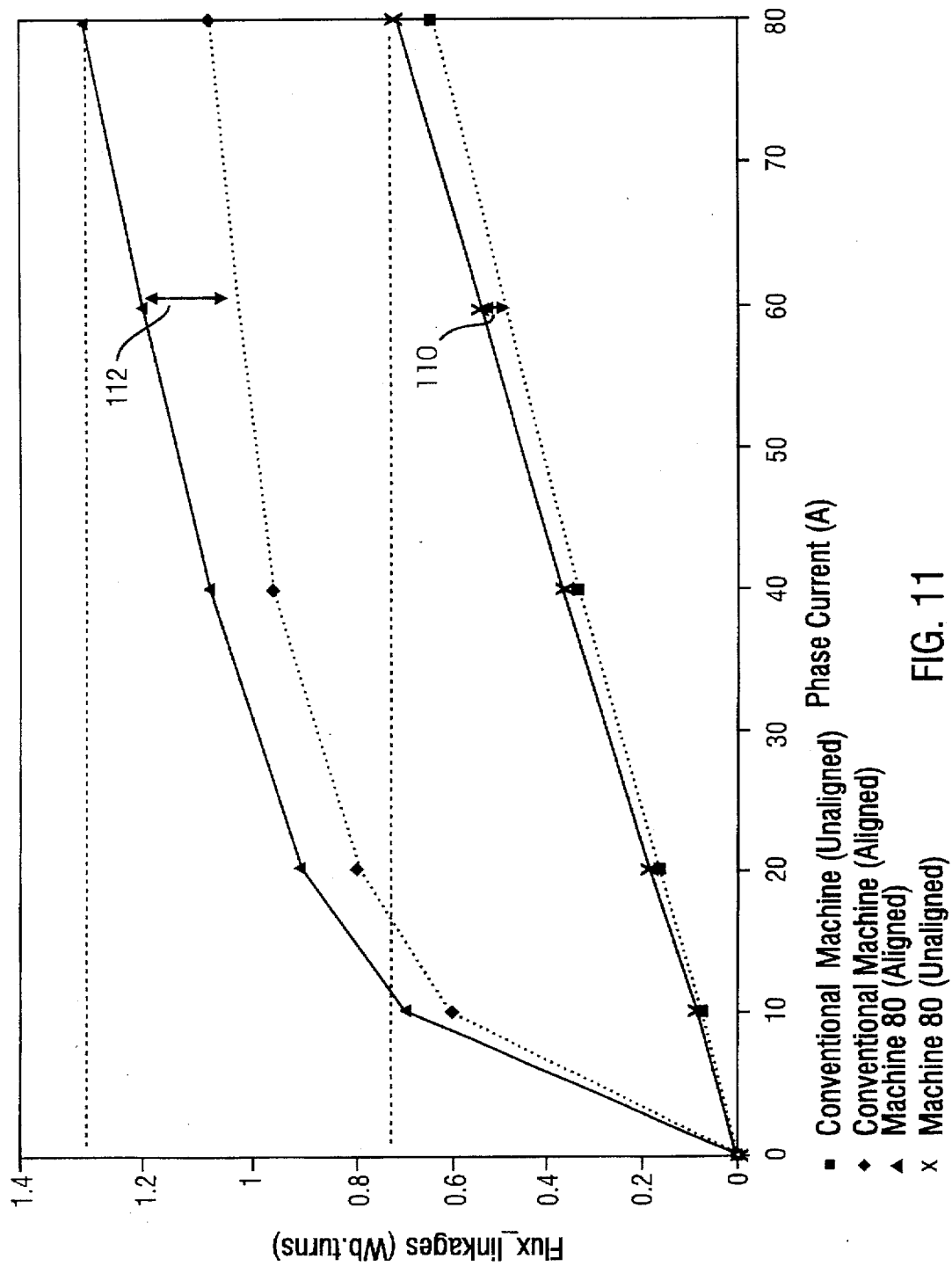
FIGS. 11 and 12 illustrate flux-linkage versus phase energization currents for the machine of FIG. 8 and a conventional reluctance machine.
Figure 12:
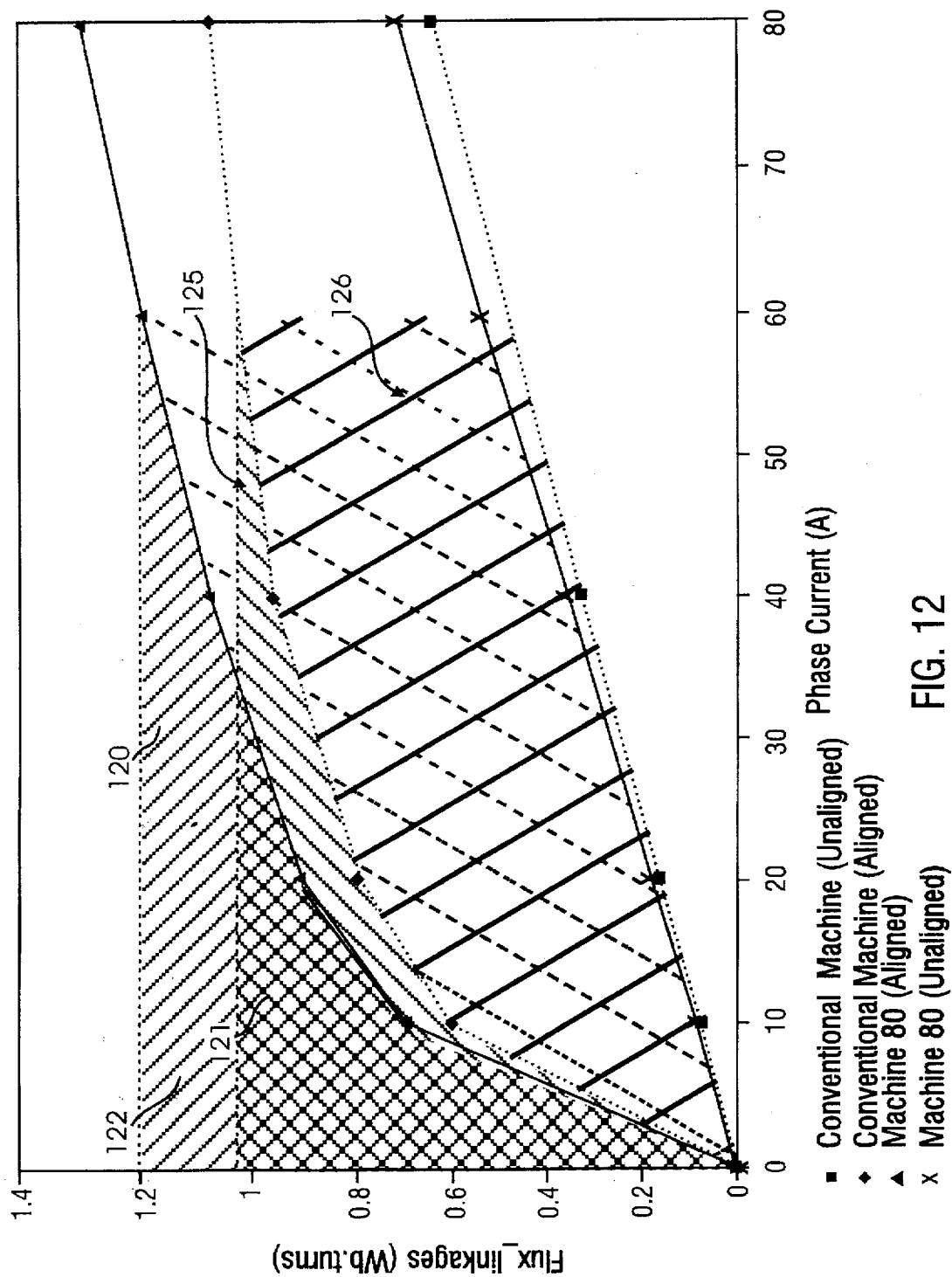

FIG. 12 illustrates further advantages of machines constructed in accordance with the teachings of the present invention using the general representations of FIG. 11. FIG. 12 generally illustrates the flux-linkage vs. current curve for a machine in accordance with the present invention and a machine having similar stator laminations but wound in a conventional fashion. Dashed lines 120 and 121 have been added to identify the flux-linkage points for a given phase energization current which, in the example, is 60 amps. As those skilled in the art will appreciate, the area above the flux-linkage vs. current curve at a given energization current corresponds generally to the amount of energy stored in the machine at any given rotor position. This energy is not wasted, but is available for energy conversion during machine operation. In general, the greater the stored energy potentially the more efficient the machine and the higher the torque output. As reflected in FIG. 12, the area above the curve for the machine in accordance with the present invention 122 (e.g., the hatched area with solid hatching) is greater than the corresponding area 121 for the similarly-sized conventional machine (e.g., the area with dashed hatching). While FIG. 12 illustrates this stored energy for only one rotor position and one phase energization current, it is representative of the case for virtually all rotor positions and all phase energization currents. In sum, the provision of auxiliary flux paths according to the teachings of the present invention results in a machine having increased stored energy and efficiency than available from similarly-sized conventional machines. On the other hand, at the same excitation current level, the greater the stored energy the greater the energy being sent back to the converter during the current extinguishing process of the excited phase, thus the greater the converter power rating. However, as can be appreciated next, to obtain the same output torque, the excitation current level is lower in the new machine than in the conventional machine, thus lower current rating of switching devices.

FIG. 12 also illustrates the increased torque advantages of machines constructed according to the teachings of the present invention. As those skilled in the art will appreciate, the torque output of a reluctance machine generally corresponds to the area within the locus traversed in the flux-linkage vs. phase current curves plane when the rotor rotates from unalignment to alignment. Here, a comparison of the areas between the unaligned and aligned curves indicates that the maximum available torque output of the machine constructed according to certain aspects of the present invention (area 125) is greater than that associated with the conventionally wound machine (area 126). Thus, a machine constructed according to the teachings of the present invention will tend to have a greater torque output than a conventionally constructed machine. This aspect of the present invention is further illustrated by FIG. 13.

Figure 13:
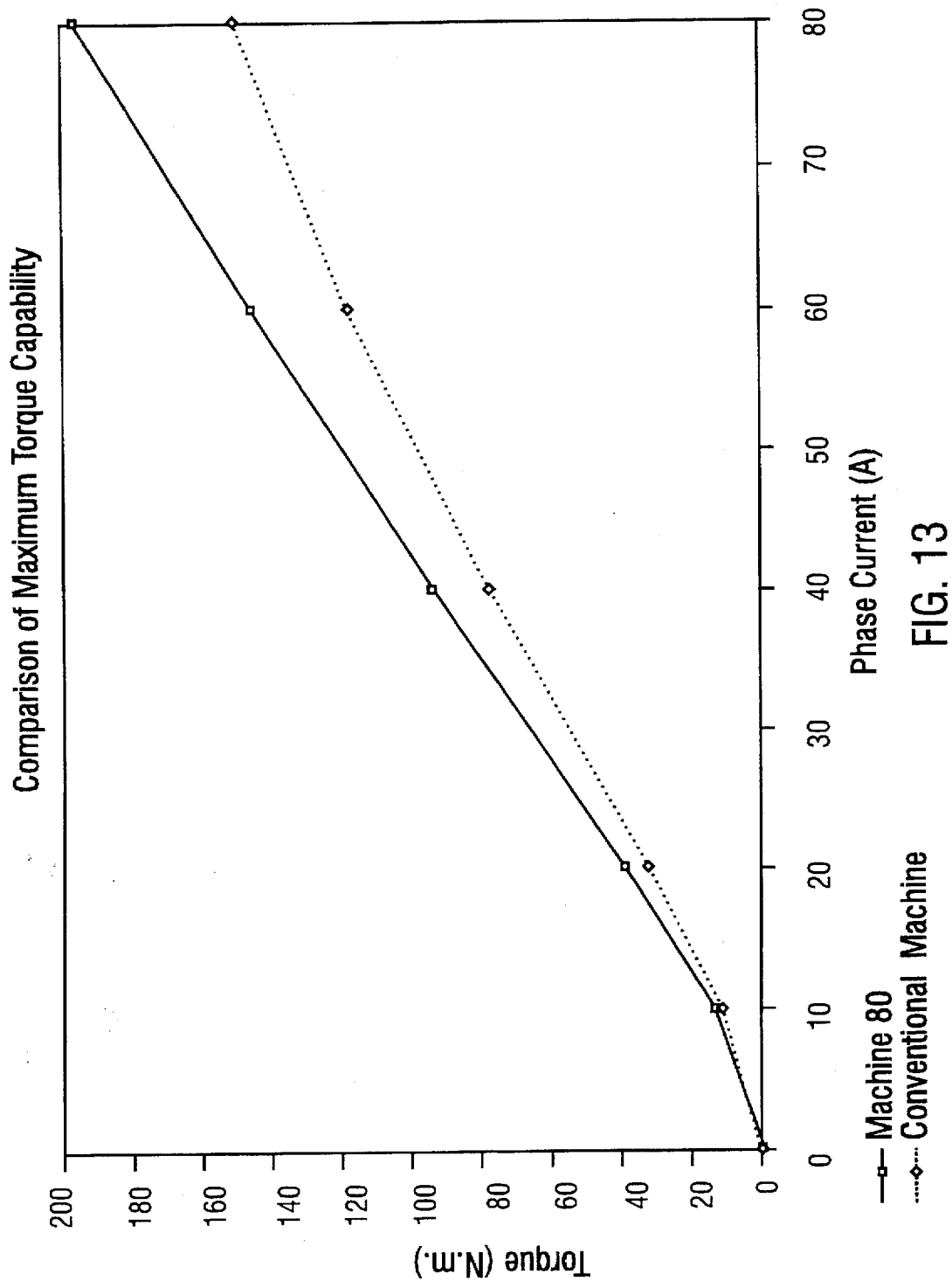
FIG. 13 illustrates maximum torque output vs. phase energization current for a machine constructed according to certain aspects of the present invention and for a similarly sized conventional machine.

FIG. 13 illustrates maximum torque output vs. phase energization current for a machine constructed according to the teachings of the present invention and for a conventional machine with the same laminations. As the figure indicates, for each magnitude of phase current the torque output of the machine constructed according to the teachings of the present invention is greater than that of the conventional machine. Moreover, as may be noted, the increase in torque output grows larger as the magnitude of the phase energization current is increased and saturation phenomena begins to more significantly impact machine performance.

The above description of the present invention is intended to be exemplary only and is not intended to limit the scope of any patent issuing from this application. For example, the present discussion was in the context of a multi-phase reluctance machine where the various phase windings were interleaved. The present invention is also applicable to single-phase reluctance machines or other types of reluctance machines where the phase windings are not interleaved. In such machines, the auxiliary flux paths may be provided by separating each phase energization coil from the stator pole it excites by a spacer or simply by an inter-pole projection. Moreover, the exemplary disclosure contained herein was in the context of a three phase, twelve stator pole, eight rotor pole machine. Other phase, stator pole and rotor pole combinations are possible and will not depart from the present invention. The present invention may be used in many applications including industrial applications, specialty applications, appliance applications, aerospace applications, and automotive applications. The present invention is intended to be limited only by the scope and spirit of the following claims.

What is claimed is:

1. A stator for a reluctance machine comprising:
   a stator defining at least a first stator pole; and
   a coil of electrically conductive material positioned generally about the first stator pole, such that, when the stator is excited by establishing electric current in the coil, a main flux path is established that passes through the first stator pole and an auxiliary flux path is established that passes through the coil but does not pass through the first stator pole.

2. The stator of claim 1 wherein the stator defines a plurality of stator poles, wherein there is a second stator pole adjacent to the first stator pole and wherein the auxiliary flux path passes through the second stator pole.

3. The stator of claim 2 wherein there is an inter-polar gap between the first stator pole and the second stator pole and wherein the stator defines an inter-polar projection extending from the stator into the inter-polar gap.

4. A stator for a reluctance machine comprising:
   a stator defining at least a first stator pole and a second stator pole adjacent to the first stator pole, wherein there is an inter-polar gap between the first stator pole and the second stator pole and wherein the stator defines an inter-polar projection extending from the stator into the inter-polar gap; and
   a coil of electrically conductive material positioned generally about the first stator pole, such that when the stator is excited by establishing electric current in the coil, a main flux path is established through the first stator pole and an auxiliary, flux path is established that passes through the second stator pole but does not pass through the first stator pole, wherein the coil defines at least one side turn portion and wherein the at least one side turn portion is positioned between the second stator pole and the inter-pole projection.

5. A reluctance machine comprising a stator defining a plurality of stator poles, a rotor adapted to rotate relative to the stator, and a plurality of phase windings positioned within the stator, wherein at least one phase winding comprises a plurality of coils, wherein each coil is generally wound about at least one stator pole so as to excite the one stator pole when the coil is energized, and wherein application of electric current to the at least one phase winding establishes main flux paths through the excited stator poles and auxiliary flux paths through non-excited stator poles.

6. The reluctance machine of claim 5 wherein there are N total stator poles and M coils in the at least one phase winding and wherein auxiliary flux paths are established through N-M stator poles when the at least one phase winding is energized where N and M are positive integers and where N is greater than M.

7. The reluctance machine of claim 5 wherein there are twelve stator poles and wherein the at least one phase winding comprises four coils.

8. A stator for a reluctance machine comprising:
   a stator core that defines a plurality of stator poles including a first stator pole and a second stator pole adjacent to the first stator pole, the first and second stator poles defining a first inter-polar gap there between; and
   a first phase winding comprising a coil, the coil defining a first side turn portion, wherein the coil generally encircles the first stator pole and wherein the first side turn portion is positioned within the first inter-polar gap such that the first side turn portion is physically closer to the second stator pole than to the first stator pole.

9. The stator of claim 8 wherein an inter-polar projection extends from the stator into the first inter-polar gap and wherein the inter-polar projection is positioned between the first side turn portion and the first stator pole.

10. The stator of claim 8 wherein the first side turn portion is in physical contact with the second stator pole.

11. The stator of claim 8 further defining a second phase winding, the second phase winding comprising a coil, the coil of the second phase winding defining side turn portions, wherein the coil of the second phase winding is positioned within the first inter-polar gap between the side turn portion of the coil of the first phase winding and the first stator pole.

12. The stator of claim 8 further comprising a third stator pole adjacent to the first stator pole on a side opposite the side of the second stator pole, the first and third stator poles defining a second inter-polar gap there between, wherein the coil of the first phase winding defining a second side turn portion, and wherein the second side turn portion is positioned within the second inter-polar gap such that the second side turn portion is physically closer to the third stator pole than to the first stator pole.

13. The stator of claim 12 wherein an inter-polar projection extends from the stator into the second inter-polar gap and wherein the inter-polar projection is positioned between the second side turn portion and the first stator pole.

14. A stator for a reluctance machine comprising:
   a stator core defining a plurality of stator poles; and
   at least one phase winding, the at least one phase winding comprising a plurality of coils wherein each coil generally encircles one stator pole;

wherein each coil defines two side turn portions and wherein the coils are positioned within the stator such that each side turn portion of a given coil is physically closer to a stator pole that is not encircled by the coil than to the stator pole encircled by the coil.

15. The stator of claim 14 wherein the stator comprises a plurality of phase windings, wherein each phase winding comprises a plurality of coils, where each coil defines side turn portions, and wherein each side turn portion of the coil for a given phase is separated from the stator pole it encircles by a side turn portion from a coil of a different phase.

16. The stator of claim 15 wherein adjacent stator poles define an inter-polar gap, wherein side turn portions from coils of different phase windings are positioned within each inter-polar gap and wherein an inter-polar projection extending from the stator into the inter-polar gap separates the coils of the different phase windings.

17. The stator of claim 15 wherein there are twelve stator poles.

18. A reluctance machine comprising:

a stator defining a plurality of projecting stator poles;

a rotor adapted to rotate relative to the stator; and means for exciting at least some of the stator poles such that, when the at least some stator poles are exited: (i) a main flux path is established through the excited stator poles and at least a portion of the rotor; and (ii) an auxiliary flux path is established through at least some of the stator poles that are not excited.

19. A reluctance machine comprising:

a stator defining a plurality of stator poles;

at least one phase winding wound about the stator poles, the at least one phase winding defining at least one coil generally encircling at least one stator pole, wherein the coil is positioned about the at least one stator pole such that the magnetic flux passing through the at least one coil when the coil is energized is equal to the sum of:
(i) flux passing through the at least one stator pole, and
(ii) the flux passing through an auxiliary flux path that does not include the at least one stator pole.

20. A reluctance machine having:

a stator defining a stator back-iron and a plurality of stator poles; and a phase winding that may be energized to excite the stator;

wherein the peak magnetic flux in the stator back-iron when the phase winding is energized is greater than half of the peak magnetic flux in any given stator pole.

21. A method of energizing a reluctance machine, the reluctance machine comprising a stator defining a plurality of stator poles and a rotor, the method comprising the act of:

exciting at least a first set of the stator poles such that: (i) main flux paths are established through the first set of stator poles and at least a portion of the rotor; and (ii) auxiliary flux paths are established that do not pass through the first set of stator poles or the rotor.

* * * * *

UNITED STATES PATENT AND TRADEMARK OFFICE
CERTIFICATE OF CORRECTION

PATENT NO. : 5,717,269
DATED : February 10, 1998
INVENTOR(S) : Yifan Tang

It is certified that error appears in the above-identified patent and that said Letters Patent is hereby corrected as shown below:

On the title page, following the section labeled "U.S. PATENT DOCUMENTS," please insert:
-- OTHER INFORMATION
Stephenson and Blake, "The Characteristics, Design and Applications of Switched Reluctance Motors and Drives," PCIM Conference & Exhibition, June 21-24, 1993, Nuremberg, Germany--.

In claim 4, column 12, line 1, following "auxiliary" and before "flux", please delete ",".

Signed and Sealed this

Fourteenth Day of April, 1998

*Attest:*

BRUCE LEHMAN

*Attesting Officer*  *Commissioner of Patents and Trademarks*